(12) United States Patent
Wu et al.

(10) Patent No.: US 12,507,202 B2
(45) Date of Patent: Dec. 23, 2025

(54) USER NOTIFICATION FOR SERVICE INTERRUPTION

(71) Applicant: T-Mobile USA, Inc., Bellevue, WA (US)

(72) Inventors: Raymond Weimin Wu, Newcastle, WA (US); Sridhar Bethamsetty, Frisco, TX (US); Vikas Ranjan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 367 days.

(21) Appl. No.: 18/341,072

(22) Filed: Jun. 26, 2023

(65) Prior Publication Data
US 2024/0430854 A1 Dec. 26, 2024

(51) Int. Cl.
*H04W 68/00* (2009.01)
*H04W 24/04* (2009.01)

(52) U.S. Cl.
CPC .......... *H04W 68/00* (2013.01); *H04W 24/04* (2013.01)

(58) Field of Classification Search
CPC .............................. H04W 68/00; H04W 24/04
USPC ....................................... 455/422.1; 370/338
See application file for complete search history.

(56) References Cited

U.S. PATENT DOCUMENTS

2007/0232278 A1 * 10/2007 May .................. H04M 1/72451
455/566

* cited by examiner

*Primary Examiner* — Marcos Batista
(74) *Attorney, Agent, or Firm* — Lee & Hayes, P.C.

(57) ABSTRACT

System and methods for selecting customers to notify of a service interruption or outage are described. A network may receive an interruption notification indicating when a service interruption is to occur. In some examples, the interruption notification may also include a particular set of equipment, such as a base station, that will experience the interruption, such as being taken offline for maintenance or a power outage affecting the base station. A notification module determines which customers will be affected by the service interruption and transmits a notification to the customers, informing the customers of the service interruption.

20 Claims, 5 Drawing Sheets

USER NOTIFICATION FOR SERVICE INTERRUPTION

BACKGROUND

A core network (also known as network core or backbone network) is the central part of a telecommunications network that provides various services to telecommunication devices, often referred to as user equipment ("UE"), that are connected by access network(s) of the telecommunications network. Operations of various components of the telecommunications network can be affected by various factors, such as fires, weather, the availability of power, and upgrades/ maintenance to the system, among others. These factors can cause service outages, resulting in a service interruption to one or more users of the telecommunications network.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Overview

Figure 1:
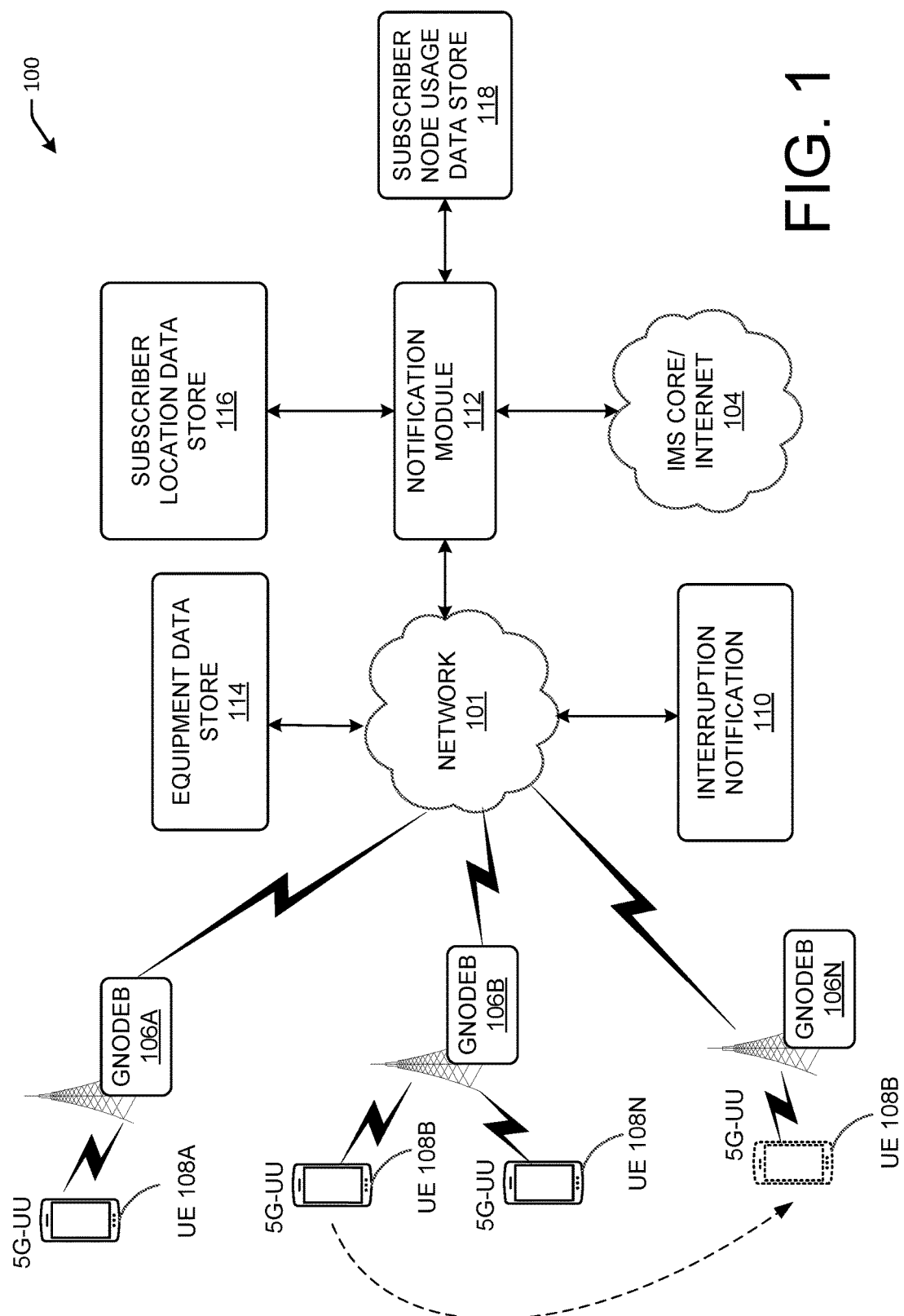
FIG. 1 is a schematic diagram of an illustrative wireless communication network environment in which systems and techniques for notifying customers of a service interruption may be implemented, in accordance with examples of the disclosure.

It should be understood that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Telecommunications networks rely on equipment in various locations in order to provide various services to its customers. If one or more pieces of equipment are unavailable or non-functioning, the telecommunication network may not be able to provide the services to the users of its network. In some situations, the unavailability of the equipment, which results in a service outage, may not be known prior to the equipment being unavailable. These situations are often related to weather or natural disasters, such as fire. In these situations, providing information to the users prior to the service outage may not be possible because the first indication of an issue may be the service outside itself.

In other situations, the service outage may be due to a known or planned event. In these situations, the service outage, and the particular equipment associated with the service outage, may be known prior to the event. Thus, it may be helpful to provide notice to users that may be affected by the service outage if the service outage is known ahead of time. Providing a notice can help users plan for the service outage, reduce customer calls to a customer service line, and improve quality of service to the customers. However, simply sending out a generic message to a wide swath of customers may not be beneficial. The message can be an inefficient use of system resources because the message may be received by users that will not be affected by the service outage, using more system resources than what may be required and potentially leading to confusion among customers.

This disclosure is directed in part to systems and methods for providing directed notifications of potential or planned service interruptions (or outages). The presently disclosed subject matter discloses the use of historical customer use data and current customer use data to determine customers to which a notification message is to be sent. In some examples, the system determines the probability that a particular customer may be affected by the service outage. The historical data provides, in some examples, information to the network indicating 1) the customers in a particular time frame that have used equipment that will be affected by the service interruption and 2) the probability that those customers will be using the affected equipment and may experience a service interruption. A notification is generated based on the determination and transmitted to the customers that may be affected by the service outage.

Illustrative environments, signal flows, and techniques for implementing systems and methods for repository function address blocking are described below. However, the described systems and techniques may be implemented in other environments.

FIG. 1 is a schematic diagram of an illustrative wireless network environment 100 in which the disclosed systems and techniques may be implemented. The environment 100 may include a wireless communications network 101. The wireless communications network 101 may be any one or more networks that facilitate communications between devices of various types, such as computing devices and mobile devices (e.g., UEs). Various connections between devices in the network 101 may be wired, wireless, or a combination thereof. In various embodiments, the wireless communications network 101 (or network 101) may facilitate communications with one or more wireless devices, such as UEs. In FIG. 1, the wireless communications network 101 is described as a 5G, or fifth-generation, network, although it should be understood that the presently disclosed subject matter is not limited to a 5G network and may be used in other generations and versions of cellular network. In general, the wireless communications network 101 can be implemented as a variety of technologies to provide wired and/or wireless access to a network, as discussed herein. In some instances, the wireless communications network 101 can include a 3GPP Radio Access Network ("RAN"), a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the wireless communications network 101 can include any number and type of transceivers and/or base stations representing any number and type of macrocells, microcells, picocells, or femtocells, for example, with any type or amount of overlapping coverage or mutually exclusive coverage. The wireless communications network 101 may facilitate packet-based communications between such wireless devices and devices on the Internet and/or one or more IMSs (IP Multimedia Subsystems), such as IMS Core/Internet 104. The IMS Core/Internet 104 enables internet protocol (IP)-based real-time services, including voice calls, text messages (SMS) and multimedia messages (MMS). It should be understood that various additional modules associated with cellular networks or other RANs are not illustrated herein merely for purposes of description and not to limit the application of the examples described herein to cellular networks or RANs without those modules. For example, in some instances, the wireless network environment 100 can further include one or more communication servers to facilitate communications by and between the various devices in the wireless communications network 101. That is, the wireless communications network 101 can include any computing devices implementing various aspects of one or more of second, third, fourth, and fifth generation (2G, 3G, 4G, 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G communication technologies. Thus, the wireless network environment 100 may implement GSM, UMTS, LTE/LTE Advanced, and/or NR telecommunications technologies. The wireless network environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets. While FIG. 1 illustrates the wireless network environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

As mentioned above, the wireless network environment 100 further includes base stations gNodeB 106A-106N (hereinafter referred to individually as "the gNodeB 106A," "the gNodeB 106B," "the gNodeB 106N," and collectively as "the gNodeB 106"). While referred to as a "gNodeB" for explanatory purpose herein, the gNodeB 106A-106N may be any type of base station, including, but not limited to, any type of base transceiver station (BTS), NodeB, eNodeB, gNodeB, and the like. The gNodeB 106 may communicate with other devices and elements in the core of wireless communications network 101 and facilitates communication of user devices with the wireless communications network 101.

The wireless network environment 100 further includes user equipment (or devices) UE 108A-108N (hereinafter referred to individually as "the UE 108A," "the UE 108B," "the UE 108N," and collectively as "the UE 108"). The UE 108 are used by users or devices to communicate with and using the wireless communications network 101. As illustrated, the UE 108 use a 5G-UU, or air, interface to communicate with the wireless communications network 101, although other types of interfaces may be used and are considered to be within the scope of the presently disclosed subject matter. Examples of the UE 108 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 108 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network, such as the wireless communications network 101 or another network.

As mentioned above, if a service outage was to occur, it may be beneficial to notify customers that may be impacted by the service outage. This may help customers plan for the service outage. However, simply broadcasting a notice of a service outage to a generalized group of customers may unnecessarily use system resources and potentially confuse customers that have not connection to the service outage. For example, a power company may be conducting rolling blackouts in an area that will cause a base station in the area to lose power. This can affect a network's ability to receive and send transmissions through the base state, causing a service outage to those customers that are in the coverage area of the base station. If the notification is a broadcast to all customers, or even to all customers in the same state as the rolling blackout, the customers may unnecessarily be placed on notice for an event (the service outage) that does not affect them.

In FIG. 1, for example, the network 101 may receive an interruption notification 110 indicating that the gNobeB 106B will lose power at a particular day and time. The interruption notification 110 can originate from various sources including, but not limited to, a power company, a source associated with the network 101, or any other third party. The interruption notification 110 can include information about the interruption itself, such as the type of interruption, how long the interruption (or service outage) is expected to take, and the like. In the example noted above, the interruption notification 110 can originate from a power company indicating that a location will lose power.

Once the interruption notification 110 is received, the network 101 communicates the interruption notification 110 to a notification module 112. The notification module 112 is designed to receive the interruption notification 110, determine the services that may be affected, and which customers will receive a service interruption notice. If the interruption notification 110 includes an area to be affected, such as a location, the notification module 112 access an equipment data store 114 to determine which equipment of the network 101 may be affected by the power outage in the particular location. The equipment data store 114 includes one or more tables of various pieces of equipment of the network 101 and their location. For example, the equipment data store 114 can include a table indicating the gNobeBs 106 and each of their locations. The notification module 112 looks up the table stored in the equipment data store 114 and determines which gNobeBs 106 are located in the areas that will be losing power.

In some examples, the interruption notification 110 may include an indication of the equipment. For example, maintenance may need to be done on the gNodeB 106B. An employee or system of the network 101 may generate the interruption notification 110 to inform the network 101 that the gNodeB 106B will be shut down for maintenance at a particular time and date. Thus, in this instance where the affected equipment is included in the interruption notification, the notification module 112 may not need to access the equipment data store 114 because the identity of the equipment is already known.

Once the equipment, such as the gNodeB 106B in this example, is known, the notification module 112 then determines which customers may be affected by the service outage indicated by the interruption notification 110. To accomplish this, the notification module 112 commences a process of customer selection to generate a focused list of affected customers. The notification module 112 determines which customers to notify based on a probability of the customer being affected by the service outage. The notification module 112 first determines which customers have used the affected equipment within a period of time, for example, six (6) months and exclude those customers that have not used the affected equipment within the set time frame, eliminating a first set of customers to generate the focused list of customers to receive a notification. A reason for including a time frame is that the time frame may be a good indication of the behavior of the customer. If a customer has not used the affected equipment within the time frame, there may be a low probability that the customer will be using the affected equipment at the time of the service outage. The notification module 112 accesses a subscriber location data store 116 to determine which customers of the network 101 have used the affected equipment, e.g., gNodeB 106B, within a determined time frame. The notification module 112 receives the customers that have used the affected equipment within the determined time frame.

To further modify the focused list of customers by excluding a second set of customers from the notification, if desired, the notification module 112 thereafter uses customer (or subscriber) usage data to further exclude customers from the notification based on a predetermined frequency of usage. For example, a first customer (or subscriber) that has used the affected equipment within the time frame may have used the affected equipment once within the determined time frame, whereas a second customer may have used the affected equipment every day during the determined time frame. For example, the second customer may live in a location that is serviced or covered by the affected equipment, whereas the first customer may have traveled through the area. Thus, in order of probability of being affected by the service outage, the second customer would more likely be affected than the first customer. Thus, the notification module 112 may exclude customers that have only used the affected equipment a predetermined number of times. The notification module 112 accesses a subscriber node usage data store 118 to determine the customers that have used the gNodeB 106B (the affected equipment in this example) a predetermined number of times (frequency) within the predetermined time frame.

The subscriber node usage data store 118 may be used to further exclude customers from a notification by providing the notification with travel information of various customers. For example, the UE 108B may have communicated with the gNodeB 106B one time within the predetermined time frame. However, when accessing the subscriber node usage data store 118, the notification module 112 may determine that the UE 108B also has communicated with the gNodeB 106N within the predetermined time frame, and that the UE 108B has used the gNodeB 106N as the primary communication base station, indicating that the coverage of the UE 108B by the gNodeB 106B (the affected equipment) was temporary, i.e., was below a minimum threshold number of uses within the predetermined time frame. Based on this information, the notification module 112 may exclude transmitting a notification to the UE 108B.

It should be noted that in some examples, customers may not be excluded, but rather, prioritized. For example, the network 101 may determine that a certain number of notifications may be transmitted within a period of time. Thus, the notification module 112 may, rather than exclude customers, prioritize the transmission of the notification over others. For example, the notification module 112 may give a first, or higher priority, to customers that use the gNodeB 106B within the predetermined period of time and at a predetermined frequency. The notification module 112 may then instruct the network 101 to transmit a notification message to those customers first. The notification module 112 may then give a lower, or second priority, to customers that used the affected equipment within the period of time but did not use the equipment at the predetermined frequency (such as once a week). The notification module 112 may then give a still lower, or third priority, to customers that have used the affected equipment but not within the predetermined frequency or the predetermined time.

Figure 2:
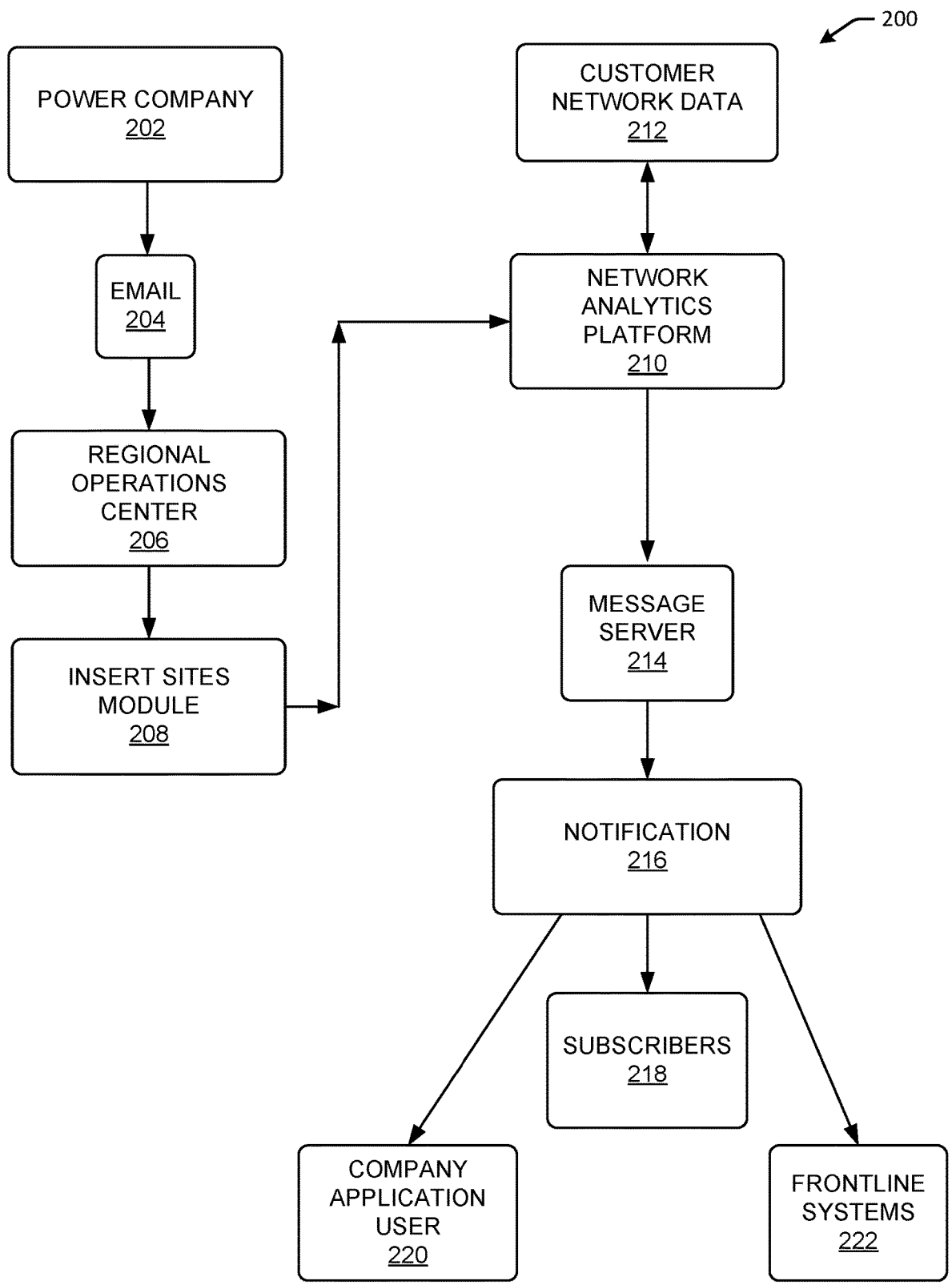
FIG. 2 is an illustration of a service interruption system where a service interruption notice is provided by a third-party to a network, in accordance with examples of the present disclosure.

FIG. 2 is an illustration of a service interruption system 200 where a service interruption notice is provided by a third-party to the network 101, in accordance with examples of the present disclosure. In the example illustrated in FIG. 2, the third-party is a power company 202 that provides electrical power to one or more components of the network 101, such as the gNodeBs 106 of FIG. 1. It should be noted, however, that the power company 202 is merely an example of a third-party. In FIG. 2, the power company 202 has determined that power will be removed from an area at a particular day and time. The power company 202 transmits that information in the form of an email 204 to a regional operations center 206 of the network 101. It should be noted that the power company 202 can transmit the power outage information in other forms of communication. Further, the communication, such as the email 204, may be transmitted to various components or modules of the network 101, with the regional operations center 206 being an example. The regional operations center 206 is a local system of the network 101 that handles various functions for the network 101 in the location to which the regional operations center 206 is assigned. The locations can include general locations of a country, such as "east" or "west," may be states or countries, or may be municipalities within an area. The presently disclosed subject matter is not limited to any particular type of location. The regional operations center 206 confirms sites within the affected area provided in the email 204, such as base stations or other equipment that, when power is removed, may cause a service interruption or outage.

The regional operations center 206 provides the sites that will be affected to an insert sites module 208. Preferentially, the regional operations center 206 will provide the sites that will be affected within twenty-four hours after receiving the email 204 from the power company 202, though aspects of the presently disclosed subject matter is not limited to any particular time frame. The insert sites module 208 transmits the information provided in the email 204 and the sites that will be affected to a network analytics platform 210. The network analytics platform 210 acts as the notification module 112 of FIG. 1. The network analytics platform 210 access customer network data 212 to determine which customers to notify based on comparing customer dominant/most visited base stations against the affected site(s). As described by way of example in FIG. 1, to accomplish this, the network analytics platform 210 commences a process of customer selection. The network analytics platform 210 determines which customers to notify based on a probability of the customer being affected by the service outage. The network analytics platform 210 determines which customers have used the affected equipment within a period of time, for example, six (6) months and exclude those customers that have not used the affected equipment within the set time frame. The network analytics platform 210 accesses the customer network data 212 to determine which customers of the network 101 have used the affected equipment, e.g., gNodeB 106B, within a determined time frame. The network analytics platform 210 receives the customers that have used the affected equipment within the determined time frame.

To further exclude customers from a notification, if desired, the network analytics platform 210 thereafter uses the customer network data 212 to further exclude customers from the notification based on a predetermined frequency of usage. For example, a first customer (or subscriber) that has used the affected equipment within the time frame may have used the affected equipment once within the determined time frame, whereas a second customer may have used the affected equipment every day during the determined time frame. For example, the second customer may live in a location that is serviced or covered by the affected equipment, whereas the first customer may have traveled through the area. Thus, in order of probability of being affected by the service outage, the second customer would more likely be affected than the first customer. Thus, the network analytics platform 210 may exclude customers that have only used the affected equipment a predetermined number of times.

After the list of customers that will be affected by the power outage is generated by the network analytics platform 210, the list is provided to a message server 214. The message server 214 determines, using the list, how the customers in the affected customer list are to be notified. In some examples, the account types of the customers are used to determine the manner in which a notification is transmitted. For example, if a customer is a home internet customer, the use of a messaging service such as short messaging service (SMS) may not be a preferential type of message, as the home internet subscriber may not have a way of receiving the SMS message. In that example, the use of an email address or a voice message transmitted to a cellular number provided by the customer may be a preferential mode of notification. In another example, if the customer is a cellular network customer that subscribes to the network 101 for use of a cell phone, an SMS may be a preferential mode of communication. Further, the message server 214 may determine that the customer uses a special type of communication, such as an application installed on the customer's cellular device that is configured to receive and display communications received from the network 101. The message server 214 transmits a customer notification 216 to various customer types, such as a subscriber 218, a company application user 220, or a frontline systems 222 customer. A frontline systems 222 customer may be a user of the affected equipment, but not a subscriber 218 or a company application user 220.

Figure 3:
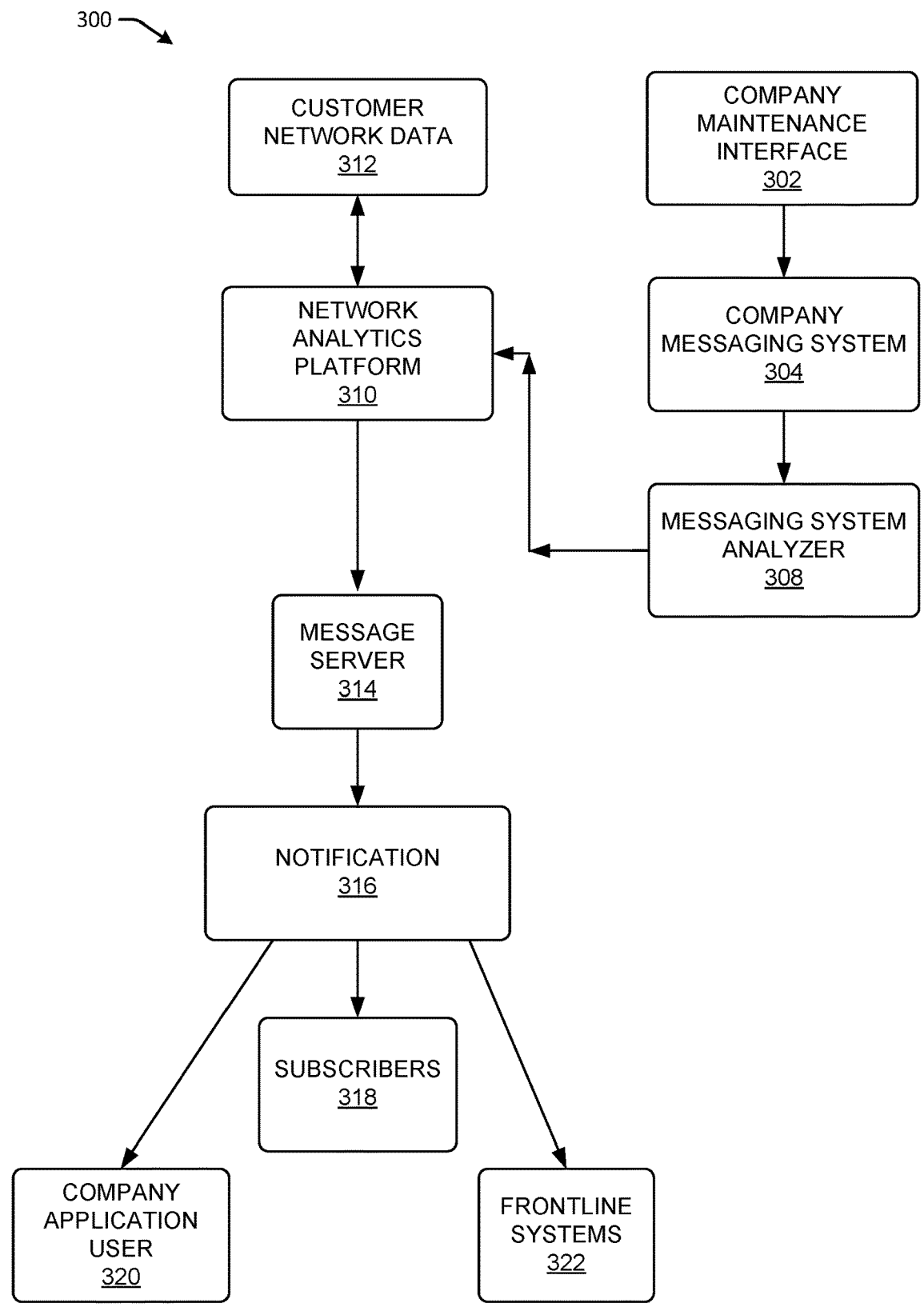
FIG. 3 is an illustration of a service interruption system where a service interruption notice is provided by a component of a company that operates or services a network, in accordance with examples of the present disclosure.

FIG. 3 is an illustration of a service interruption system 300 where a service interruption notice is provided by a component of the company that operates or services the network 101, in accordance with examples of the present disclosure. In the example illustrated in FIG. 3, the component is a company maintenance interface 302 used by one or more employees of the company that operates the network 101 that maintains and services one or more components of the network 101, such as the gNodeBs 106 of FIG. 1. In FIG. 3, the employee(s) determines that gNodeB 106B of FIG. 1 is to be brought down for servicing at a particular day and time. The employee provides that information using the company maintenance interface 302. A company messaging system 304 receives the information from the company maintenance interface 302 and provides that information to a messaging system analyzer 308. The messaging system analyzer 308 extracts information input into the company maintenance interface 302, including the affected equipment.

The messaging system analyzer 308 transmits the information provided in the company maintenance interface 302 and the sites that will be affected to a network analytics platform 310. The network analytics platform 310 acts as the notification module 112 of FIG. 1. The network analytics platform 310 access customer network data 312 to determine which customers to notify based on comparing customer dominant/most visited base stations against the affected site(s). As described by way of example in FIG. 1, to accomplish this, the network analytics platform 310 commences a process of customer selection. The network analytics platform 310 determines which customers to notify based on a probability of the customer being affected by the service outage. The network analytics platform 310 determines which customers have used the affected equipment within a period of time, for example, six (6) months and exclude those customers that have not used the affected equipment within the set time frame. The network analytics platform 310 accesses the customer network data 312 to determine which customers of the network 101 have used the affected equipment, e.g., gNodeB 106B, within a determined time frame. The network analytics platform 310 receives the customers that have used the affected equipment within the determined time frame.

To further exclude customers from a notification, if desired, the network analytics platform 310 thereafter uses the customer network data 312 to further exclude customers from the notification based on a predetermined frequency of usage. For example, a first customer (or subscriber) that has used the affected equipment within the time frame may have used the affected equipment once within the determined time frame, whereas a second customer may have used the affected equipment every day during the determined time frame. For example, the second customer may live in a location that is serviced or covered by the affected equipment, whereas the first customer may have traveled through the area. Thus, in order of probability of being affected by the service outage, the second customer would more likely be affected than the first customer. Thus, the network analytics platform 310 may exclude customers that have only used the affected equipment a predetermined number of times.

After the list of customers that will be affected by the power outage is generated by the network analytics platform 310, the list is provided to a message server 314. The message server 314 determines, using the list, how the customers in the affected customer list are to be notified. In some examples, the account types of the customers are used to determine the manner in which a notification is transmitted. For example, if a customer is a home internet customer, the use of a messaging service such as short messaging service (SMS) may not be a preferential type of message, as the home internet customer may not have a way of receiving the SMS message. In that example, the use of an email address or a voice message transmitted to a cellular number provided by the customer may be a preferential mode of notification. In another example, if the customer is a cellular network customer that subscribes to the network 101 for use of a cell phone, an SMS may be a preferential mode of communication. Further, the message server 314 may determine that the customer uses a special type of communication, such as an application installed on the customer's cellular device that is configured to receive and display communications received from the network 101. The message server 314 transmits a notification 316 to various customer types, such as a subscriber 318, a company application user 320, or a frontline systems 322 customer. A frontline systems 322 customer may be a user of the affected equipment, but not a subscriber 318 or a company application user 320. Preferably, the notification 316 will be transmitted at least once in a time frame before the service outage, such as 24 hours, though the presently disclosed subject matter is not limited to any particular time frame or frequency of the notification 316.

Figure 4:
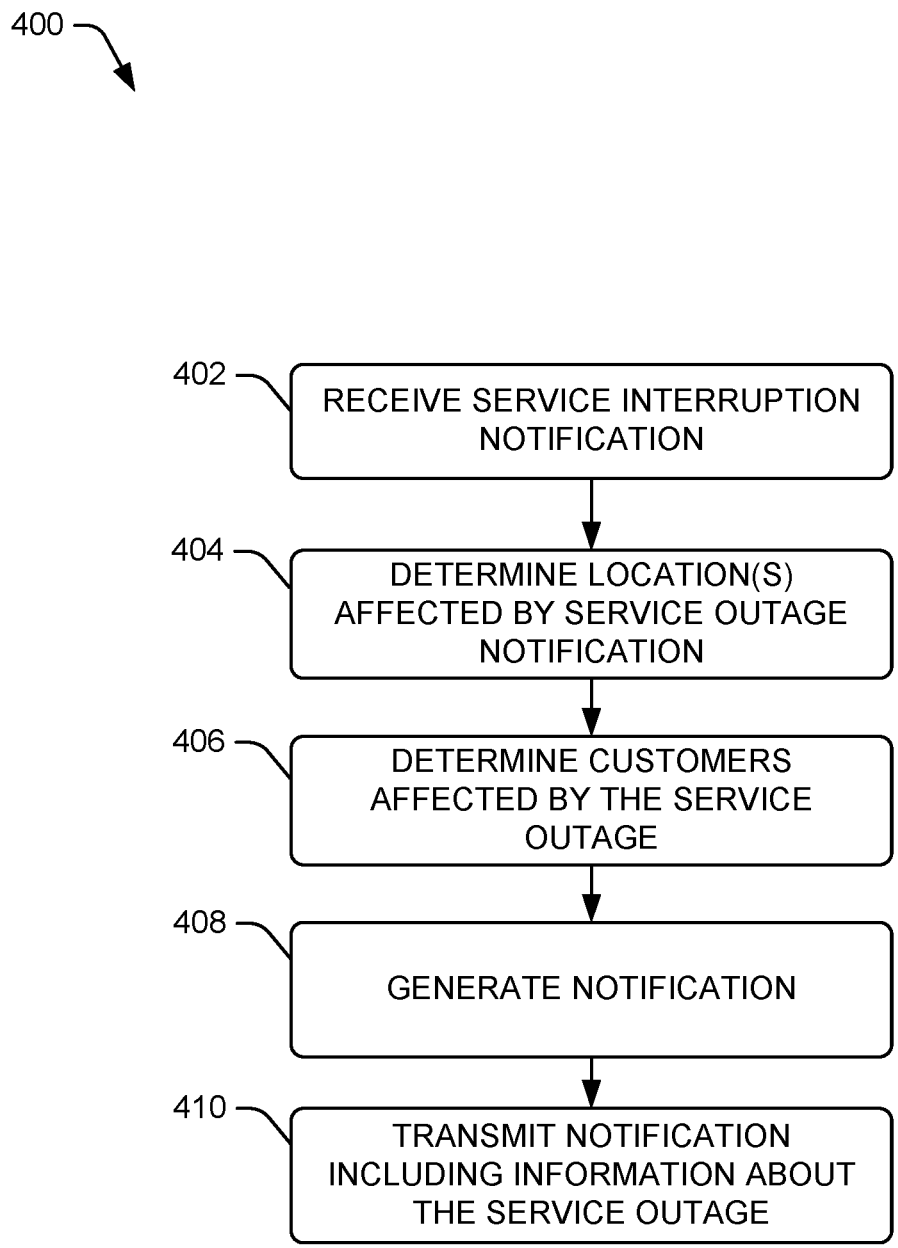
FIG. 4 shows a flow diagram of an illustrative process for notifying one or more customers of a service outage, according to examples of the presently disclosed subject matter.

FIG. 4 shows a flow diagram of an illustrative process 400 for notifying one or more customers of a service outage, according to examples of the presently disclosed subject matter. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 400 may be described with reference to the wireless network environment 100 of FIG. 1, however other environments may also be used.

At block 402, a service interruption notification 110 is received at the network 101. The service interruption notification 110 can originate from a third-party to the network 101 or one or more employees of the company that operates the network 101. For example, in FIG. 2, the third-party was the power company 202. In FIG. 3, employees use the company maintenance interface 302 to input information about a service outage.

At block 404, the network 101 determines locations affected by the service interruption notification 110. In some examples, the locations that will be affected may be provided in the service interruption notification 110, such as the power company 202 providing the geographic areas affected by a power outage.

At block 406, the network 101 determines the customers affected by the service outage. An example is provided in FIG. 1, whereby the notification module 112 commences a process of customer selection. The notification module 112 determines which customers to notify based on a probability of the customer being affected by the service outage. The notification module 112 first determines which customers have used the affected equipment within a period of time, for example, six (6) months and exclude those customers that have not used the affected equipment within the set time frame. A reason for including a time frame is that the time frame may be a good indication of the behavior of the customer. If a customer has not used the affected within the time frame, there may be a low probability that the customer will be using the affected equipment at the time of the service outage. The notification module 112 accesses a subscriber location data store 116 to determine which customers of the network 101 have used the affected equipment, e.g., gNodeB 106B, within a determined time frame. The notification module 112 receives the list of customers that have used the affected equipment within the determined time frame.

To further exclude customers from a notification, if desired, the notification module 112 thereafter uses customer (or subscriber) usage data to further exclude customers from the notification based on a predetermined frequency of usage. For example, a first customer (or subscriber) that has used the affected equipment within the time frame may have used the affected equipment once within the determined time frame, whereas a second customer may have used the affected equipment every day during the determined time frame. For example, the second customer may live in a location that is serviced or covered by the affected equipment, whereas the first customer may have traveled through the area. Thus, in order of probability of being affected by the service outage, the second customer would more likely be affected than the first customer. Thus, the notification module 112 may exclude customers that have only used the affected equipment a predetermined number of times. The notification module 112 accesses a subscriber node usage data store 118 to determine the customers that have used the gNodeB 106B (the affected equipment in this example) a predetermined number of times (frequency) within the predetermined time frame.

The subscriber node usage data store 118 may be used to further exclude customers from a notification by providing the notification with travel information of various customers. For example, the UE 108B may have communicated with the gNodeB 106B one time within the predetermined time frame. However, when accessing the subscriber node usage data store 118, the notification module 112 may determine that the UE 108B also has communicated with the gNodeB 106N within the predetermined time frame, and that the UE 108B has used the gNodeB 106N as the primary communication base station, indicating that the coverage of the UE 108B by the gNodeB 106B (the affected equipment) was temporary. Based on this information, the notification module 112 may exclude transmitting a notification to the UE 108B.

It should be noted that in some examples, customers may not be excluded, but rather, prioritized. For example, the network 101 may determine that a certain number of notifications may be transmitted within a period of time. Thus, the notification module 112 may, rather than exclude customers, prioritize the transmission of the notification over others. For example, the notification module 112 may give a first, or higher priority, to customers that use the gNodeB 106B within the predetermined period of time and at a predetermined frequency. The notification module 112 may then instruct the network 101 to transmit a notification message to those customers first. The notification module 112 may then give a lower, or second priority, to customers that used the affected equipment within the period of time but did not use the equipment at the predetermined frequency (such as once a week). The notification module 112 may then give a still lower, or third priority, to customers that have used the affected equipment but not within the predetermined frequency or the predetermined time. In FIGS. 2 and 3, the network analytics platform 210/310 acts in a manner similar to the notification module 112 and may be interchangeable or the same component or module as the notification module 112.

At block 408, the network generates a notification. The message server 214 determines, using the list, how the customers in the affected customer list are to be notified. In some examples, the account types of the customers are used to determine the manner in which a notification is transmitted. For example, if a customer is a home internet customer, the use of a messaging service such as short messaging service (SMS) or push notification may not be a preferential type of message, as the home internet customer may not have a way of receiving the SMS message. In that example, the use of an email address or a voice message transmitted to a cellular number provided by the customer may be a preferential mode of notification. In another example, if the customer is a cellular network customer that subscribes to the network 101 for use of a cell phone, an SMS may be a preferential mode of communication. Further, the message server 214 may determine that the customer uses a special type of communication, such as an application installed on the customer's cellular device that is configured to receive and display communications received from the network 101.

At block 410, the message server 214 transmits a notification 216 to various customer types, such as a subscriber 218, a company application user 220, or a frontline systems 222 customer. A frontline systems 222 customer may be a user of the affected equipment, but not a subscriber 218 or a company application user 220.

Figure 5:
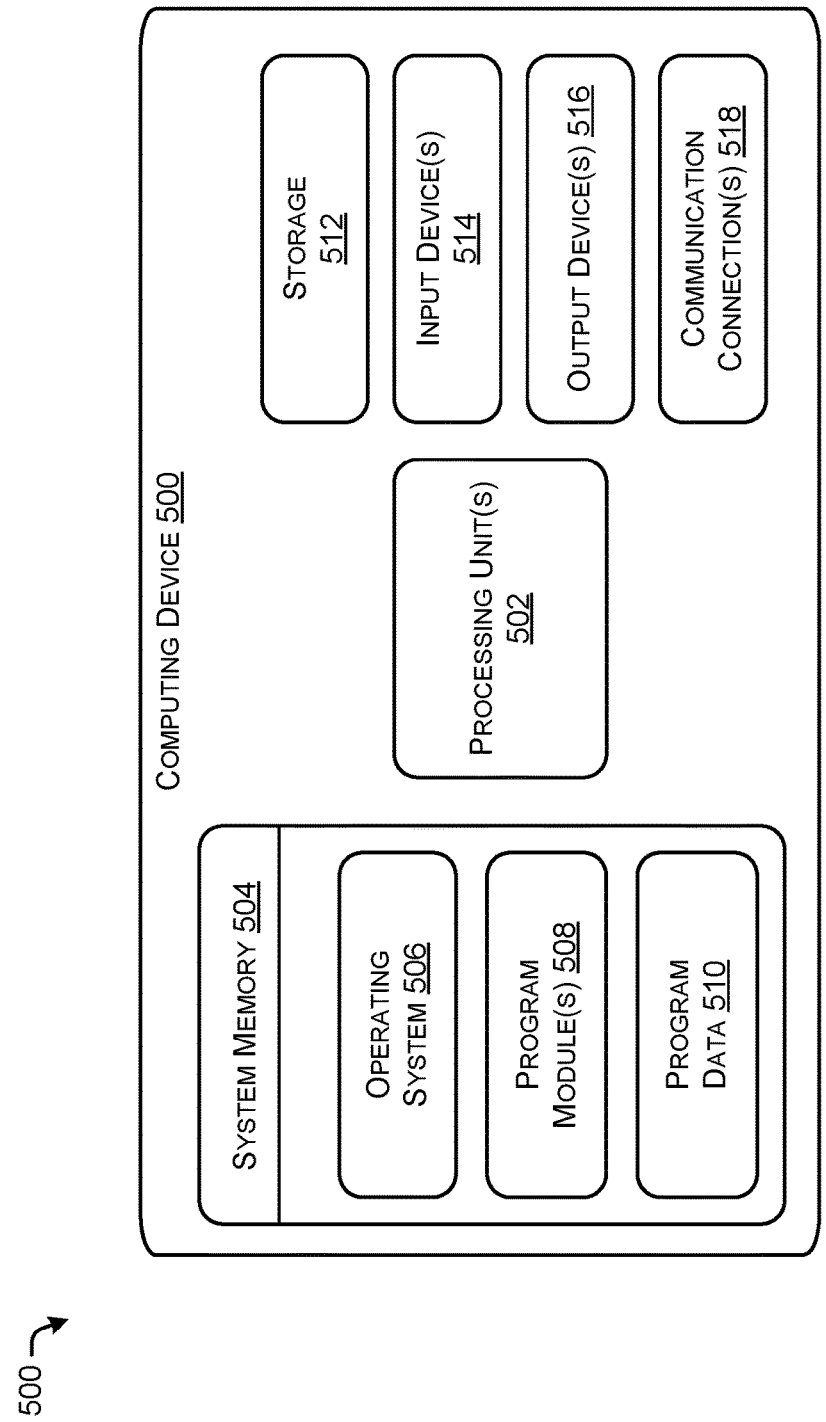
FIG. 5 is an example of a computing device for use with the systems and methods disclosed herein, in accordance with some examples of the present disclosure.

FIG. 5 is an example of a computing device 500 for use with the systems and methods disclosed herein, in accordance with some examples of the present disclosure. The computing device 500 can be used to implement various components of a core network, a base station, and/or any servers, routers, gateways, gateway elements, administrative components, etc. that can be used by a communication provider. One or more computing devices 500 can be used to implement the network 101, for example. One or more computing devices 500 can also be used to implement base stations and other components.

In various embodiments, the computing device 500 can include one or more processing units 502 and system memory 504. Depending on the exact configuration and type of computing device, the system memory 504 can be volatile (such as RAM), non-volatile (such as ROM, flash memory, etc.) or some combination of the two. The system memory 504 can include an operating system 506, one or more program modules 508, and can include program data 510. The system memory 504 may be secure storage or at least a portion of the system memory 504 can include secure storage. The secure storage can prevent unauthorized access to data stored in the secure storage. For example, data stored in the secure storage can be encrypted or accessed via a security key and/or password. The program modules can include instructions to execute the notification module 112 of FIG. 1.

The computing device 500 can also include additional data storage devices (removable and/or non-removable) such as, for example, magnetic disks, optical disks, or tape. Such additional storage is illustrated in FIG. 5 by storage 512.

Non-transitory computer-readable storage media of the computing device 500 can include volatile and nonvolatile, removable and non-removable media implemented in any method or technology for storage of information, such as computer readable instructions, data structures, program modules, or other data. The system memory 504 and storage 512 are examples of computer readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by computing device 500. Any such non-transitory computer readable storage media can be part of the computing device 500.

In various embodiment, any or all of the system memory 504 and storage 512 can store programming instructions which, when executed, implement some or all of the functionality described above as being implemented by one or more systems configured in the environment 100 and/or components of the network 101.

The computing device 500 can also have one or more input devices 514 such as a keyboard, a mouse, a touch-sensitive display, voice input device, etc. The computing device 500 can also have one or more output devices 516 such as a display, speakers, a printer, etc. can also be included. The computing device 500 can also contain one or more communication connections 518 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

All methods, systems, and apparatuses, including all equivalents, disclosed.

A. A method, comprising: receiving, at a network, a service interruption notification comprising information about a service interruption that will affect one or more services provided to customers of the network; determining, using the information in the service interruption notification, equipment that will be affected by the service interruption; generating, using the equipment that will be affected by the service interruption, a list of one or more customers that have used the equipment; eliminating, from the list of the one or more customers likely affected by the service interruption, a first set of customers that have not used the equipment within a predetermined time frame to generate a focused list of customers to notify; determining a notification type for each customer in the focused list of customers to notify; and transmitting, using the notification type for each customer in the focused list of customers to notify, a customer notification to each of the focused list of customers to notify.

B. The method of paragraph A, further comprising modifying the focused list of customers to notify by excluding a second set of customers that have not used the equipment based on a frequency of usage within the predetermined time frame.

C. The method of any of paragraphs A or B, further comprising modifying the focused list of customers to notify by excluding a third set of customers that have used the equipment below a minimum threshold number of uses of the equipment within the predetermined time frame.

D. The method of any of paragraphs A-C, wherein determining the notification type comprises accessing customer network data; and retrieving an account type for each customer listed in the focused list of customers.

E. The method of any of paragraphs A-D, wherein the account type comprises a home internet subscriber, a cellular network customer, or a user of an application configured to receive and display communications relating to the network.

F. The method of any of paragraphs A-E, wherein the service interruption notification is received from a third-party.

G. The method of any of paragraphs A-F, wherein the third-party is a power company that provides power to an area associated with the service interruption notification.

H. The method of any of paragraphs A-G, wherein the service interruption notification is received from an employee of a company that operates the network, wherein the service interruption notification is related to maintenance to be performed on the equipment.

I. The method of any of paragraphs A-H, wherein the customer notification comprises an email, a text, a push notification, or a voice message.

J. A non-transitory computer-readable media storing computer-executable instructions that, when executed by one or more processors, cause the one or more processors to perform operations comprising: receiving, at a network, a service interruption notification comprising information about a service interruption that will affect one or more services provided to customers of the network; determining, using the information in the service interruption notification, equipment that will be affected by the service interruption; generating, using the equipment that will be affected by the service interruption, a list of one or more customers that have used the equipment; eliminating, from the list of the one or more customers likely affected by the service interruption, a first set of customers that have not used the equipment within a predetermined time frame to generate a focused list of customers to notify; determining a notification type for each customer in the focused list of customers to notify; and transmitting, using the notification type for each customer in the focused list of customers to notify, a customer notification to each of the focused list of customers to notify.

K. The non-transitory computer-readable media of paragraph J, further comprising computer-executable instructions that, when executed by the one or more processors, cause the one or more processors to perform operations comprising modifying the focused list of customers to notify by excluding a second set of customers that have not used the equipment based on a frequency of usage within the predetermined time frame.

L. The non-transitory computer-readable media of any of paragraphs J-K, further comprising computer-executable instructions that, when executed by the one or more processors, cause the one or more processors to perform operations comprising modifying the focused list of customers to notify by excluding a third set of customers that have used the equipment below a minimum threshold number of uses of the equipment within the predetermined time frame.

M. The non-transitory computer-readable media of any of paragraphs J-L, wherein the computer-executable instructions for determining the notification type comprises computer-executable instructions that, when executed by the one or more processors, cause the one or more processors to perform operations comprising accessing customer network data; and retrieving an account type for each customer listed in the focused list of customers.

N. The non-transitory computer-readable media of any of paragraphs J-M, wherein the account type comprises a home internet subscriber, a cellular network customer, or a user of an application configured to receive and display communications relating to the network.

O. The non-transitory computer-readable media of any of paragraphs J-N, wherein the service interruption is received from a power company or an employee of a company that operates the network.

P. The non-transitory computer-readable media of any of paragraphs J-O, wherein the customer notification comprises an email, a text, or a voice message.

Q. A system comprising a memory storing computer-executable instructions; and a processor in communication with the memory, the computer-executable instructions causing the processor to perform acts comprising: receiving, at a network, a service interruption notification comprising information about a service interruption that will affect one or more services provided to customers of the network; determining, using the information in the service interruption notification, equipment that will be affected by the service interruption; generating, using the equipment that will be affected by the service interruption, a list of one or more customers that have used the equipment; eliminating, from the list of the one or more customers likely affected by the service interruption, a first set of customers that have not used the equipment within a predetermined time frame to generate a focused list of customers to notify; determining a notification type for each customer in the focused list of customers to notify; and transmitting, using the notification type for each customer in the focused list of customers to notify, a customer notification to each of the focused list of customers to notify.

R. The system of paragraph Q, further comprising computer-executable instructions for modifying the focused list of customers to notify by excluding a second set of customers that have not used the equipment based on a frequency of usage within the predetermined time frame.

S. The system of any of paragraphs Q-R, further comprising computer-executable instructions for modifying the focused list of customers to notify by excluding a third set of customers that have used the equipment below a minimum threshold number of uses of the equipment within the predetermined time frame.

T. The system of any of paragraphs Q-S, wherein the service interruption notification is received from a power company that provides power to an area associated with the service interruption notification.

While the example clauses described above are described with respect to one particular implementation, it should be understood that, in the context of this document, the content of the example clauses can also be implemented via a method, device, system, computer-readable medium, and/or another implementation. Additionally, any of the examples A-S can be implemented alone or in combination with any other one or more of the examples A-S.

Conclusion

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
  receiving, at a network, a service interruption notification comprising information about a service interruption that will affect one or more services provided to customers of the network;
  determining, using the information in the service interruption notification, equipment that will be affected by the service interruption;
  generating, using the equipment that will be affected by the service interruption, a list of one or more customers that have used the equipment;
  eliminating, from the list of the one or more customers likely affected by the service interruption, a first set of customers that have not used the equipment within a predetermined time frame to generate a focused list of customers to notify;
  determining a notification type for each customer in the focused list of customers to notify; and transmitting, using the notification type for each customer in the focused list of customers to notify, a customer notification to each of the focused list of customers to notify.

2. The method of claim 1, further comprising modifying the focused list of customers to notify by excluding a second set of customers that have not used the equipment based on a frequency of usage within the predetermined time frame.

3. The method of claim 2, further comprising modifying the focused list of customers to notify by excluding a third set of customers that have used the equipment below a minimum threshold number of uses of the equipment within the predetermined time frame.

4. The method of claim 1, wherein determining the notification type comprises:
accessing customer network data; and
retrieving an account type for each customer listed in the focused list of customers.

5. The method of claim 4, wherein the account type comprises a home internet subscriber, a cellular network customer, or a user of an application configured to receive and display communications relating to the network.

6. The method of claim 1, wherein the service interruption notification is received from a third-party.

7. The method of claim 6, wherein the third-party is a power company that provides power to an area associated with the service interruption notification.

8. The method of claim 1, wherein the service interruption notification is received from an employee of a company that operates the network, wherein the service interruption notification is related to maintenance to be performed on the equipment.

9. The method of claim 1, wherein the customer notification comprises an email, a text, a push notification, or a voice message.

10. A non-transitory computer-readable media storing computer-executable instructions that, when executed by one or more processors, cause the one or more processors to perform operations comprising:
receiving, at a network, a service interruption notification comprising information about a service interruption that will affect one or more services provided to customers of the network;
determining, using the information in the service interruption notification, equipment that will be affected by the service interruption;
generating, using the equipment that will be affected by the service interruption, a list of one or more customers that have used the equipment;
eliminating, from the list of the one or more customers likely affected by the service interruption, a first set of customers that have not used the equipment within a predetermined time frame to generate a focused list of customers to notify;
determining a notification type for each customer in the focused list of customers to notify; and
transmitting, using the notification type for each customer in the focused list of customers to notify, a customer notification to each of the focused list of customers to notify.

11. The non-transitory computer-readable media of claim 10, further comprising computer-executable instructions that, when executed by the one or more processors, cause the one or more processors to perform operations comprising modifying the focused list of customers to notify by excluding a second set of customers that have not used the equipment based on a frequency of usage within the predetermined time frame.

12. The non-transitory computer-readable media of claim 11, further comprising computer-executable instructions that, when executed by the one or more processors, cause the one or more processors to perform operations comprising modifying the focused list of customers to notify by excluding a third set of customers that have used the equipment below a minimum threshold number of uses of the equipment within the predetermined time frame.

13. The non-transitory computer-readable media of claim 10, wherein the computer-executable instructions for determining the notification type comprises computer-executable instructions that, when executed by the one or more processors, cause the one or more processors to perform operations comprising:
accessing customer network data; and
retrieving an account type for each customer listed in the focused list of customers.

14. The non-transitory computer-readable media of claim 13, wherein the account type comprises a home internet subscriber, a cellular network customer, or a user of an application configured to receive and display communications relating to the network.

15. The non-transitory computer-readable media of claim 10, wherein the service interruption is received from a power company or an employee of a company that operates the network.

16. The non-transitory computer-readable media of claim 10, wherein the customer notification comprises an email, a text, or a voice message.

17. A system comprising:
a memory storing computer-executable instructions; and
a processor in communication with the memory, the computer-executable instructions causing the processor to perform acts comprising:
receiving, at a network, a service interruption notification comprising information about a service interruption that will affect one or more services provided to customers of the network;
determining, using the information in the service interruption notification, equipment that will be affected by the service interruption;
generating, using the equipment that will be affected by the service interruption, a list of one or more customers that have used the equipment;
eliminating, from the list of the one or more customers likely affected by the service interruption, a first set of customers that have not used the equipment within a predetermined time frame to generate a focused list of customers to notify;
determining a notification type for each customer in the focused list of customers to notify; and
transmitting, using the notification type for each customer in the focused list of customers to notify, a customer notification to each of the focused list of customers to notify.

18. The system of claim 17, further comprising computer-executable instructions for modifying the focused list of customers to notify by excluding a second set of customers that have not used the equipment based on a frequency of usage within the predetermined time frame.

19. The system of claim 18, further comprising computer-executable instructions for modifying the focused list of customers to notify by excluding a third set of customers that have used the equipment below a minimum threshold number of uses of the equipment within the predetermined time frame.

20. The system of claim 17, wherein the service interruption notification is received from a power company that provides power to an area associated with the service interruption notification.

\* \* \* \* \*